April 18, 1939.  P. B. CAMP  2,154,663

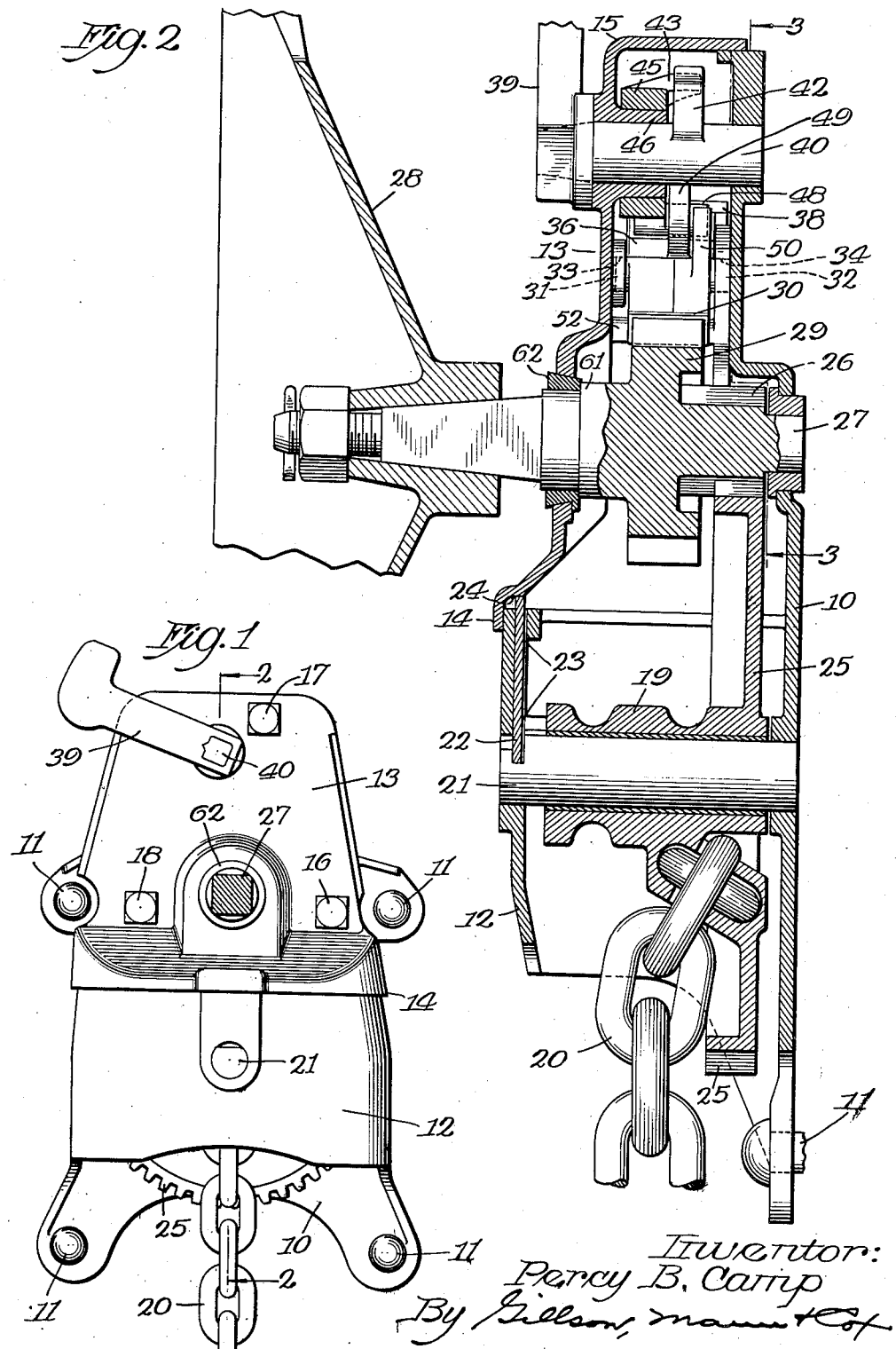

HAND BRAKE ACTUATING MECHANISM

Filed July 27, 1936  3 Sheets-Sheet 2

Inventor:
Percy B. Camp
By Gillson, Mann &
Attys.

April 18, 1939.  P. B. CAMP  2,154,663
HAND BRAKE ACTUATING MECHANISM
Filed July 27, 1936  3 Sheets-Sheet 3
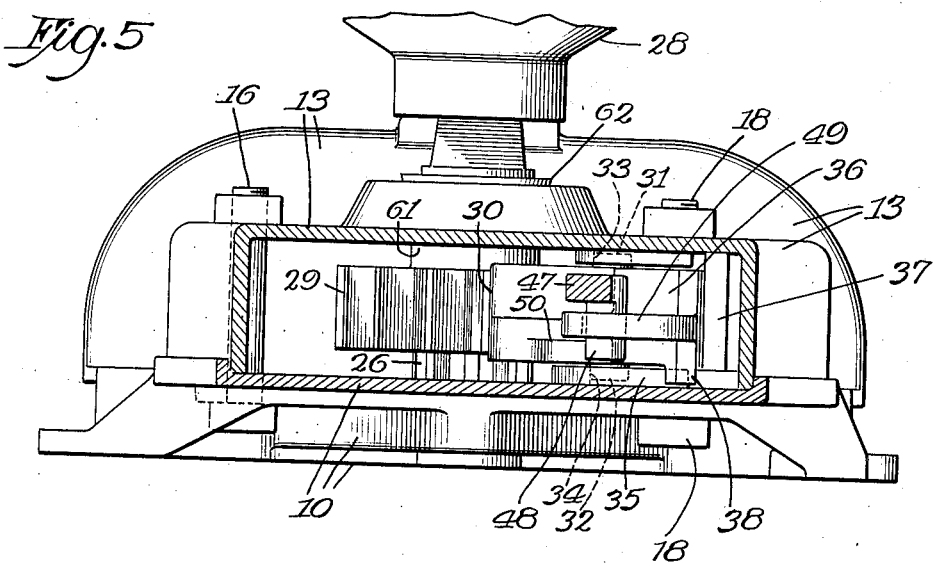
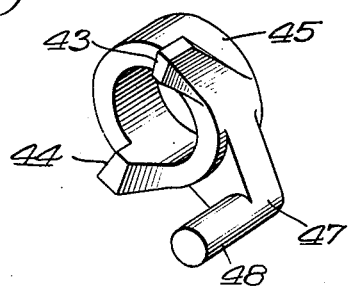
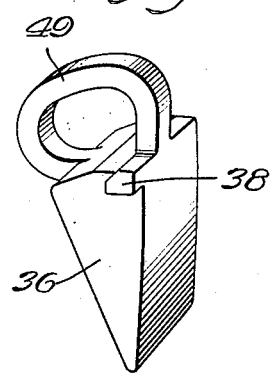
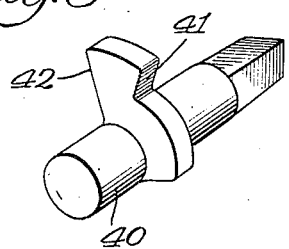
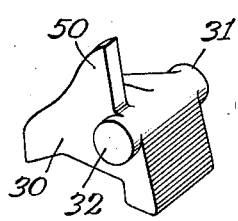
Inventor:
Percy B. Camp
By Gibson, Mann & Co.
Attys.

Patented Apr. 18, 1939

2,154,663

UNITED STATES PATENT OFFICE 2,154,663

HAND BRAKE ACTUATING MECHANISM

Percy B. Camp, Maywood, Ill., assignor to Universal Draft Gear Attachment Co., a corporation of Illinois Application July 27, 1936, Serial No. 92,820

20 Claims. (Cl. 74—505)

The invention relates to mechanism for the manual control of brake mechanism for railway cars.

Its objects are to provide an improved housing for the actuating mechanism having great strength while providing for access to the gearing without requiring complete dismemberment; to so relate the actuating and controlling mechanism with the housing as to promote convenience in assembling and strength in operation; and to provide an improved form of controlling means for brake actuating mechanism.

Further improvements in devices of this character will be pointed out in connection with the description of the structure and its mode of operation.

While the invention may be variously embodied, a desirable form of construction is hereinafter described and is illustrated in the accompanying drawings, in which Fig. 1 is a front elevation of the device;

Fig. 2 is a sectional view on the line 2—2 of Fig. 1;

Fig. 5 is a sectional view on the line 5—5 of Fig. 3;

Figs. 6, 7, 8 and 9 are views in perspective of some of the movable parts of the device.

Figure 3:
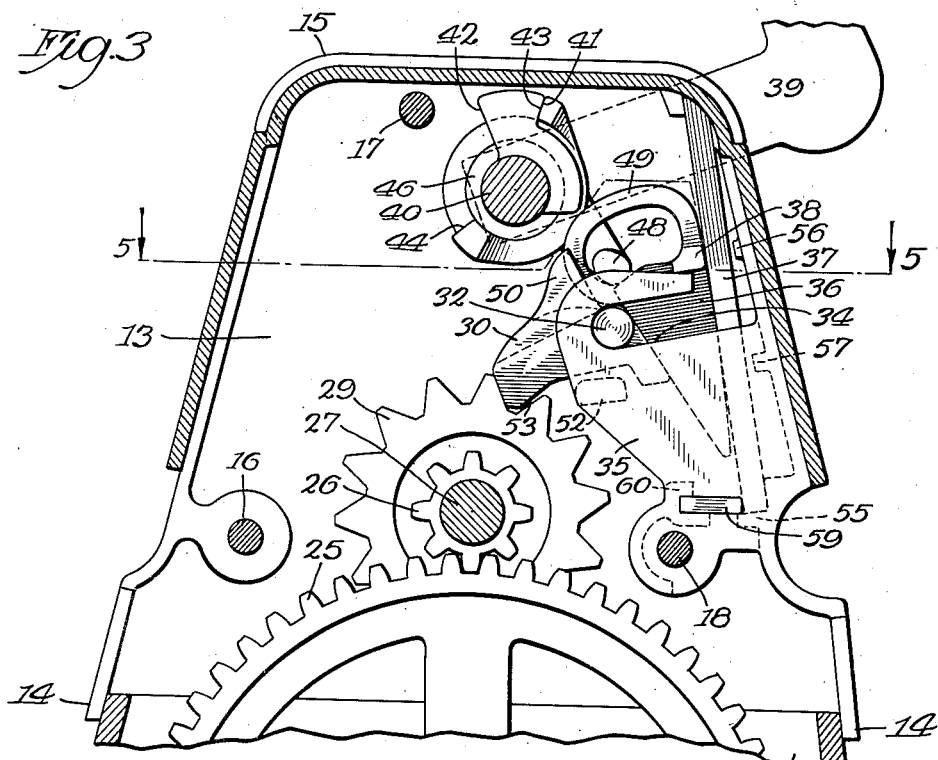
Fig. 3 is a detail section on the line 3—3 of Fig. 2.

The operating mechanism for hand brakes is subjected to trying service. The stresses imposed upon it in applying the brakes are very great, and the abuses to which it is subjected, particularly when mounted on cars unloaded by machinery, such as steam shovels and magnets, are very destructive. Disuse for a time causes the bearings to become gummed up, necessitating cleaning. It is necessary, therefore, that such mechanism shall be of very rugged construction, and shall be easy of access for servicing.

It is the common and approved practice to secure such mechanism to the car by means of rivets in order that the attachment should not work loose. It is necessary, in view of this practice, to provide a housing for the mechanism which shall not only be sturdy but be easy of access. Durability requires that the greatest load placed upon the mechanism be sustained by an integral housing for the parts through which it is applied; convenience of access being provided for by covering the remaining parts of the device with a readily removable housing which also serves to support them in part. These objects have been attained in the present invention.

The housing for inclosing the operating mechanism comprises a wall plate 10, adapted to be attached to a wall of a railway car, as by means of rivets 11, as many being employed as may be deemed necessary. An integral cover plate, 12, arches over the lower portion of the plate 10, and is open at both top and bottom. A removable cover plate 13 arches over the upper portion of the wall plate 10, and preferably overlaps the upper margin of the plate 12, as shown at 14. The upper end portion of the plate 13 is closed, as indicated at 15.

The plate 13 is secured to the wall plate 10 by means of suitable screw bolts, as indicated at 16, 17 and 18. The two cover plates effectually protect the enclosed gearing from the weather, and the upper one is readily removable for purposes of cleaning and repair, permitting the removal of the drum and its appurtenances.

The winding drum 19, to which the brake chain 20 is attached, is journaled upon a non-rotative pin 21, secured in suitable apertures in the wall plate 10 and the cover plate 12, and is held in place by a key 22, entered from above through keyways formed in the plate 12, as shown at 23. The plate 13 is provided with a shoulder 24, which bears upon the upper end of the key 22, holding it securely in place.

A gear wheel 25, formed integrally with the drum 19, is located adjacent the wall plate 10, and is driven by a pinion 26, formed upon the shaft 27 to which the hand wheel 28 is secured. The shaft 27 is journaled in suitable bearings in the back plate 10, and in the removable cover plate 13. A ratchet wheel 29 is mounted on this shaft, and preferably is formed integrally with and located adjacent to the inner end of the pinion 26. A holding pawl 30, mounted within the upper portion of the housing, cooperates with the ratchet wheel 29, to hold the shaft 27 against reverse movement.

The pawl 30 is pivotally mounted to permit the necessary oscillation as it rides over the ratchet teeth when the shaft 27 is turned for setting up the brake. The trunnions 31, 32, of the pawl are journaled in channels 33, 34, formed, respectively, in the inner face of the cover plate 13 and a flange 35 extending inwardly from the inner margin of a side wall of this plate. The inner ends of these channels are closed for positioning the pawl for oscillatable engagement with the ratchet.

The pawl 30 is held in advance position, as shown in Fig. 3, by means of a downwardly tapered removable wedge 36, which engages its rear face and reacts against a spring plate 37. A lug 38, projecting laterally from the upper end of the wedge 36, engages with the upper margin of the flange 35 to support the wedge in its advance position.

The operating mechanism is controlled by means of a handle bar 39, fixed upon a shaft 40 journaled in the upper end of the wall plate 10, and in the cover plate 13. This shaft carries a pair of cam shoulders 41, 42, which cooperate, respectively, with a pair of shoulders 43, 44, projecting axially from an annulus 45, sleeved upon a hub 46 projecting inwardly from the wall 13, and forming a part of the bearing for the shaft. A crank arm 47 projects radially from the annulus 45, and carries a crank pin 48, which projects through a loop 49 mounted upon the upper end of the wedge 36.

The oscillation of the crank arm 47, due to the turning of the annulus 45 by the cam shoulders 41, 42, shifts the wedge 36 to and from operative engagement with the pawl 30, advancing the pawl, as it moves downwardly, to bring its trunnions 31, 32, to the forward end of the slots 33, 34, and the nose of the pawl into position for cooperating with the ratchet wheel 29. As the ratchet wheel is turned during the brake-setting operation the pawl clicks over its teeth, oscillating on its trunnions. Experience has shown that the pawl may be accidentally held in elevated position. This is prevented by extending the crank pin beyond the loop of the wedge, so that by its contact with the upstanding wing 50 on the pawl it forces the latter downward. The pin 48 also locks the wedge in advanced position, as it rests on a flattened surface on the butt of the wedge which is substantially normal to a line through the pin and the shaft 40.

Figure 4:
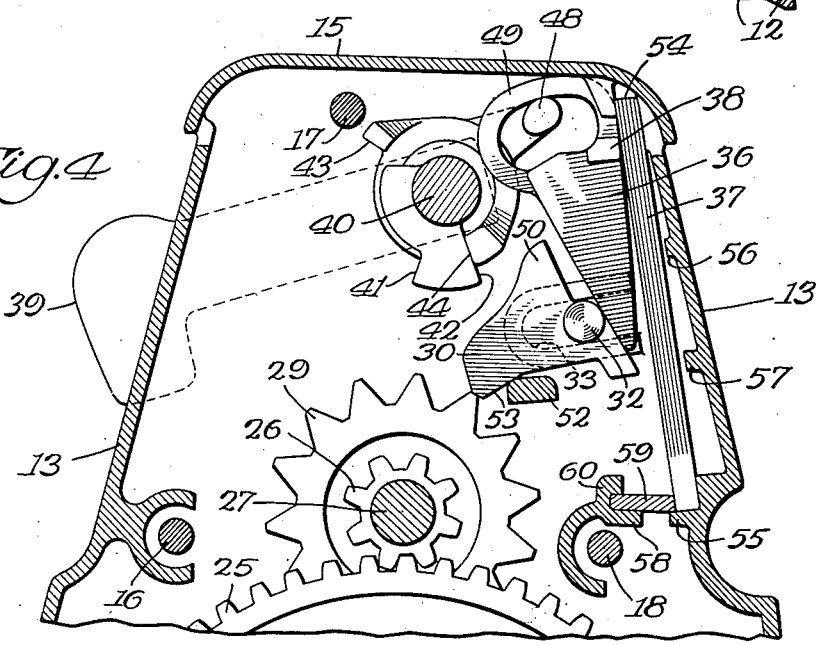
Fig. 4 is a sectional view similar to Fig. 3, with movable parts in different position.

The brake is released by swinging the handle bar 39 to the right from the position shown in Fig. 1, bringing the cam shoulder 42 into engagement with the shoulder 44, swinging the crank pin 48 upwardly and raising the wedge 36 to the position of Fig. 4. The pressure of the engaged ratchet tooth upon the nose of the pawl 30 pushes the pawl backwardly over the bar 52, extending from the inner face of the cover plate 13 to the flange 35.

The upper end of the spring plate 37 seats within a cove 54, formed in the upper end wall of the cover plate 13, and at its lower end rests upon a shoulder 55, formed on the side wall of this cover. A pair of ribs 56, 57, crossing this same wall, limit the flexure of the plate. This plate is entered through a slot in the web 58, which encircles the holes for a bolt 18, and extends to the side wall of the cover plate. A key 59, resting upon the apertured portion of the web 58, and fitting between a shoulder 60 thereon and the lower end of the spring plate 37, holds this latter plate in position.

In assembling the device the drum 19 and gear 25 are introduced between the wall plate 10 and the cover plate 12, the pin 21 is inserted through them and locked within the housing by means of the key 22, inserted from above and entering a transverse slot in the pin. The shaft 27 is now seated in its bearing in the cover plate 13, its outer end being thrust through the bearing aperture, bringing its annular shoulder 61, which may be regarded as the hub of the ratchet wheel 29, into engagement with the bearing bushing 62, seated within this aperture. The annulus 45 is now mounted upon the hub 46, the shaft 40 is inserted through this hub, and the handle bar 39 is suitably attached rigidly to its projecting end.

The pawl 30 is now positioned by entering its trunnions into the rear ends of the slots 33, 34, the wedge 36 is inserted back of the pawl, its loop 49 being caught over the crank pin 48, and the spring plate 37 is inserted and secured. The cover plate 13 is now fitted over the upper portion of the wall plate 10, the inner end of the shafts 27 and 40 entering the bearing apertures provided for them in this wall. The attaching bolts 16, 17 and 18 are now applied and secured, and the hand wheel 28 is fitted upon the outer end of the shaft 27 and suitably secured thereto. The housing being attached to the wall of a car by means of the rivets 11, the device is ready for service.

When the brakes are to be applied the handle bar 39 is thrown to the left, as shown in Fig. 1, bringing the pawl and its controlling elements to the positions of Fig. 3. To set the brake the hand wheel 28 is turned in clockwise direction and the pawl 30 clicks over the teeth of the ratchet wheel 29, holding the ratchet against recession by the bearing of its back face against the wedge 36.

For fully releasing the brake the handle bar 39 is swung to the right, raising the wedge 36 to the position of Fig. 4, whereupon the pawl is pushed backwardly by the pressure of the ratchet tooth upon its nose.

Gradual release may be effected by throwing the handle bar 39 to and slightly beyond upright position to bring the shoulder 42 into engagement with the shoulder 44, then by hand slightly tightening the brake, thus relieving the backward pressure on the pawl. The weight of the bar 39 is now sufficient to raise the wedge, and the operator may permit the wheel 28 to slip slowly through his hand until the braking pressure is sufficiently relieved. While maintaining his stance by his grasp upon the wheel with one hand, he may now again lock the mechanism by throwing the bar 39 back to the position of Fig. 1, with the other hand.

The same result may be secured more quickly by throwing the bar 39 through its full advance and return strokes, this momentarily releasing the holding mechanism and reengaging it before destructive momentum shall have been acquired. This practice is apt to be followed, as it does not require the release of the operator's supporting hand. It does involve severe shocks upon the holding mechanism, but injury thereto is prevented by the introduction of a cushion, such as the spring plate 37.

The device may be organized to provide for the counterclockwise turning of the hand wheel for setting up the brake by a mere reversal of the positions of the various parts.

I claim as my invention—

1. A housing for brake actuating mechanism comprising, in combination, an integral wall plate and winding drum cover plate having aligned bearings for a drum shaft, and an actuating gear cover plate detachably secured to the wall plate and overlapping the drum cover plate, the wall plate and actuating gear cover plate having aligned bearings for a driving shaft.

2. A housing for brake actuating mechanism comprising, in combination, an integral wall plate and winding drum cover plate having aligned bearings for a drum shaft, and an actuating gear cover plate detachably secured to the wall plate, the wall plate and actuating gear cover plate having aligned bearings for a driving shaft.

3. A housing for brake actuating mechanism comprising, in combination, an integral wall plate and winding drum cover plate having aligned bearings for a drum shaft, and an actuating gear front plate detachably secured to the wall plate, the wall plate and actuating gear front plate having aligned bearings for a driving shaft.

4. In brake actuating mechanism, in combination, a housing comprising a wall plate and a cover plate arching over the lower portion of the wall plate and integral therewith, a winding drum and shaft therefor removably mounted between the wall plate and the named cover plate, a removable cover plate arching over the upper portion of the wall plate, and actuating and control mechanism for the drum carried by the removable cover plate, revoluble parts of such mechanism being journaled in the wall plate.

5. In brake actuating mechanism, in combination, a winding drum, a gear for turning the drum, a hand wheel and shaft, a pinion and a ratchet wheel rigidly mounted on the shaft, an oscillatable holding pawl associated with the ratchet, slotted bearings for the pawl trunnions, and means for advancing the pawl in its bearings.

6. In brake actuating mechanism, in combination, a winding drum, a gear for turning the drum, a hand wheel and shaft, a pinion and a ratchet wheel rigidly mounted on the shaft, an oscillatable holding pawl associated with the ratchet, slotted bearings for the pawl trunnions, and wedge means for advancing the pawl in its bearings.

7. In brake actuating mechanism, in combination, a winding drum, a gear for turning the drum, a hand wheel and shaft, a pinion and a ratchet wheel rigidly mounted on the shaft, an oscillatable holding pawl associated with the ratchet, slotted bearings for the pawl trunnions, a shiftable wedge for advancing the pawl in its bearings, and a hand-controlled cam shaft for shifting the wedge.

8. In brake actuating mechanism, in combination, a winding drum, a gear for turning the drum, a hand wheel and shaft, a pinion and a ratchet wheel rigidly mounted on the shaft, an oscillatable holding pawl associated with the ratchet, slotted bearings for the pawl trunnions, a shiftable wedge for advancing the pawl in its bearings, and manually actuated means for controlling the wedge means.

9. In brake actuating mechanism, in combination, a winding drum, a gear for turning the drum, a hand wheel and shaft, a pinion and a ratchet wheel rigidly mounted on the shaft, an oscillatable holding pawl associated with the ratchet, slotted bearings for the pawl trunnions, wedge means for advancing the pawl in its bearings, and a spring plate forming a seat for the wedge.

10. In a brake actuating mechanism, in combination, a winding drum, a gear for turning the drum, a hand wheel and shaft, a pinion and a ratchet wheel rigidly mounted on the shaft, an oscillatable holding pawl associated with the ratchet, slotted bearings for the pawl trunnions, and cam means for advancing the pawl in its bearings.

11. In a brake control mechanism, in combination, an operating shaft, a ratchet wheel associated therewith, a pawl for holding the wheel and mounted for longitudinal and swaying movements, and releasable means for locking the pawl against longitudinal movement during the setting up of the ratchet.

12. In brake actuating mechanism, in combination, a winding drum, a gear for turning the drum, a hand wheel and shaft, a pinion and a ratchet wheel rigidly mounted on the shaft for holding the gear, an oscillatable holding pawl associated with the ratchet, slotted bearings for the pawl trunnions, removable wedge means for advancing the pawl in its bearings, and means for locking the wedge means in operative position.

13. In brake actuating mechanism, in combination, a winding drum, a gear for turning the drum, a hand wheel and shaft, a pinion and a ratchet wheel rigidly mounted on the shaft for holding the gear, an oscillatable holding pawl associated with the ratchet, slotted bearings for the pawl trunnions, removable means for advancing the pawl in its bearings, and means for locking the removable means in operative position.

14. In brake actuating mechanism, in combination, a winding drum, a gear for turning the drum, a hand wheel and shaft, a pinion and a ratchet wheel rigidly mounted on the shaft for holding the gear, an oscillatable holding pawl associated with the ratchet, slotted bearings for the pawl trunnions, wedge means for advancing the pawl in its bearings, and cushioning means forming a seat for the wedge.

15. In a brake actuating mechanism, in combination, a winding drum, a gear for turning the drum, a hand wheel and shaft, a pinion and a ratchet wheel rigidly mounted on the shaft for holding the gear, an oscillatable holding pawl associated with the ratchet, slotted bearings for the pawl trunnions, and cushioned means for advancing the pawl in its bearings.

16. In a brake control mechanism, in combination, an operating shaft, a ratchet wheel associated therewith, a pawl for holding the wheel and mounted for longitudinal and swaying movements, and cushioned means for locking the pawl against longitudinal movement during the setting up of the ratchet.

17. In a brake control mechanism, in combination, an operating shaft, a ratchet wheel associated therewith, a pawl for holding the wheel and mounted for longitudinal and swaying movements, a removable abutment for holding the pawl in advanced position, an oscillatable element for controlling the abutment, and manually actuated means for shifting the oscillatable element.

18. In a brake control mechanism, in combination, an operating shaft, a ratchet wheel associated therewith, a pawl for holding the wheel and mounted for longitudinal and swaying movements, a removable abutment for holding the pawl in advanced position, an oscillatable element for controlling the abutment, and manually actuated means for shifting the oscillatable element and having lost motion connection therewith.

19. In a brake control mechanism, in combination, an operating shaft, a ratchet wheel associated therewith, a pawl for holding the wheel and mounted for longitudinal and swaying movements, an abutment back of the pawl comprising an adjustable wedge, a manually actuated oscillatable controlling shaft having radial shoulders, an annulus mounted concentrically with the controlling shaft and having lugs for cooperating with the shoulders thereof, and a wedge-positioning crank arm carried by the annulus.

20. In a brake control mechanism, in combination, an operating shaft, a ratchet wheel associated therewith, a pawl for holding the wheel and mounted for longitudinal and swaying movements, an abutment back of the pawl comprising an adjustable wedge having a loop at its butt, a manually actuated oscillatable controlling shaft having radial shoulders, an annulus mounted concentrically with the controlling shaft and having lugs for cooperating with the shoulders thereof, and a wedge-positioning crank arm carried by the annulus and projecting into the loop.

PERCY B. CAMP.